United States Patent [19]

Valin

[11] 4,151,536
[45] Apr. 24, 1979

[54] DEVICE FOR INSCRIBING GRAPHIC AND ALPHANUMERICAL SYMBOLS ON A RECORDING MEDIUM

[75] Inventor: Jacques Valin, Paris, France

[73] Assignee: Compagnie d'Informatique Militaire, Spatiale et Aeronautique, Paris, France

[21] Appl. No.: 819,144

[22] Filed: Jul. 26, 1977

[30] Foreign Application Priority Data

Jul. 27, 1976 [FR] France ................. 76 22836

[51] Int. Cl.² ............................................. G03G 17/00
[52] U.S. Cl. ...................................... 346/162; 346/29; 346/139 C
[58] Field of Search ................. 346/139 C, 162, 163, 346/164, 153, 155, 29

[56] References Cited

U.S. PATENT DOCUMENTS

| | | | |
|---|---|---|---|
| 2,933,559 | 4/1960 | Campbell | 346/162 |
| 3,119,919 | 1/1964 | Pratt | 346/162 |
| 3,413,647 | 11/1968 | Polster | 346/162 |
| 3,436,476 | 4/1969 | Bixby | 346/162 |
| 3,553,714 | 1/1971 | Birken | 346/162 |
| 3,732,573 | 5/1973 | Merka | 346/162 |

FOREIGN PATENT DOCUMENTS 7519106 1/1976 France.
882779 11/1961 United Kingdom.

*Primary Examiner*—Jay P. Lucas
*Attorney, Agent, or Firm*—Karl F. Ross

[57] ABSTRACT

A writing head overlying a recording medium, in the form of a sheet with edges respectively extending in mutually orthogonal directions X and Y, carries a linear array of equispaced electrodes extending in the X direction over a fraction of the width of the sheet. The writing head is displaceable in the Y direction along a supporting bar which in turn may be moved in the X direction. A control unit commands the selective energization of these electrodes to record a dot pattern as the writing head moves in the Y direction to sweep a column of dot positions, the column being wide enough to accommodate several alphanumerical characters and-/or graphic symbols read out on a line-by-line basis from a plurality of memory sections. With at least one additional linear electrode array on the writing head, generally transverse to the X direction, heavy lines or curves may be traced on the recording medium.

10 Claims, 10 Drawing Figures

DEVICE FOR INSCRIBING GRAPHIC AND ALPHANUMERICAL SYMBOLS ON A RECORDING MEDIUM

The present invention relates to a device for the writing of graphic and/or alphanumerical symbols.

The device comprises a writing head (2) in contact with a recording support (1). The writing head is movable with respect to the recording support and comprises at least two linear arrays of electrodes (3 and 4). One of the two linear electrode arrays is parallel to a reference direction of the recording support and the electrodes (5), distributed along their respective linear array according to a specified pitch, are connected to a pulse generator (6) by means of a switching circuit (7) controlled by a command circuit (9).

Such a device installed at a drawing board can be utilized as a curve tracer or for the inscription of alphanumerical characters.

FIELD OF THE INVENTION

The present invention relates to a device for the writing of graphic and/or alphanumerical symbols, on a recording medium or tracing board.

BACKGROUND OF THE INVENTION

Conventional devices of this type comprise a mechanical writing head provided with a one-point stylus. Such devices do not readily permit the writing of alphanumerical characters, without loss of time or without multiple scanning of the same area of a recording medium.

Other such devices, comprising a writing head with alphanumerical characters, have the disadvantage of excessive weight and of relatively difficult handling because of the fact that the printing mechanism is located in the area of the writing head.

OBJECTS OF THE INVENTION

An object of my present invention is to provide a simplified device of the general type referred to.

Another object of the present invention is to provide a device permitting, by a single writing or scanning sweep across the recording medium, the superposition or juxtaposition of several symbols in the same area.

A third object of the present invention is the provision of means in such a device permitting the selective inscription of graphic and/or alphanumerical symbols on the same recording medium.

SUMMARY OF THE INVENTION

I realize these objects, in accordance with my present invention, by the provision of support means forming a movable guidetrack which extends in a first direction (Y) across a recording medium adapted to be marked by localized application of electric energy thereto, the support means being displaceable in a second direction (X) transverse to the first one. A writing head movably carried on the support means is displaceable along the guidetrack, i.e. in the direction Y, and is provided with a multiplicity of parallel electrodes that are closely juxtaposed with the recording medium and equispaced along a linear array extending in the direction X over a fraction of the dimension of the recording medium in that direction, i.e. transverse to the guidetrack. The writing head is thus movable, with the aid of suitable drive means known per se, in both directions to scan the recording medium with its electrodes. The latter are selectively energizable, via a switching circuit responsive to a control unit, by a pulse generator synchronized with the drive means for producing visible marks at locations corresponding to the positions of the electrodes at the instant of their energization. The control unit, operating in timed relationship with the displacement of the writing head by the drive means, actuates the switching circuit to form a predetermined pattern of marks on the recording medium.

Advantageously, pursuant to another feature of my invention, the writing head carries additional electrodes forming at least one further linear array generally transverse to the first-mentioned array. Selective energization of electrodes of both arrays allows the formation of parallel traces, possibly blending into a heavy stroke, on the recording medium upon displacement of the writing head in a direction deviating from direction Y.

BRIEF DESCRIPTION OF THE DRAWING

The above and other features of my invention will now be described with reference to the accompanying drawing in which:

FIG. 2b is a cross-sectional view taken on the line IIB—IIB of FIG. 2a;

The various elements of the illustrated device have been shown only schematically and have not been drawn to scale.

SPECIFIC DESCRIPTION

Figure 1:
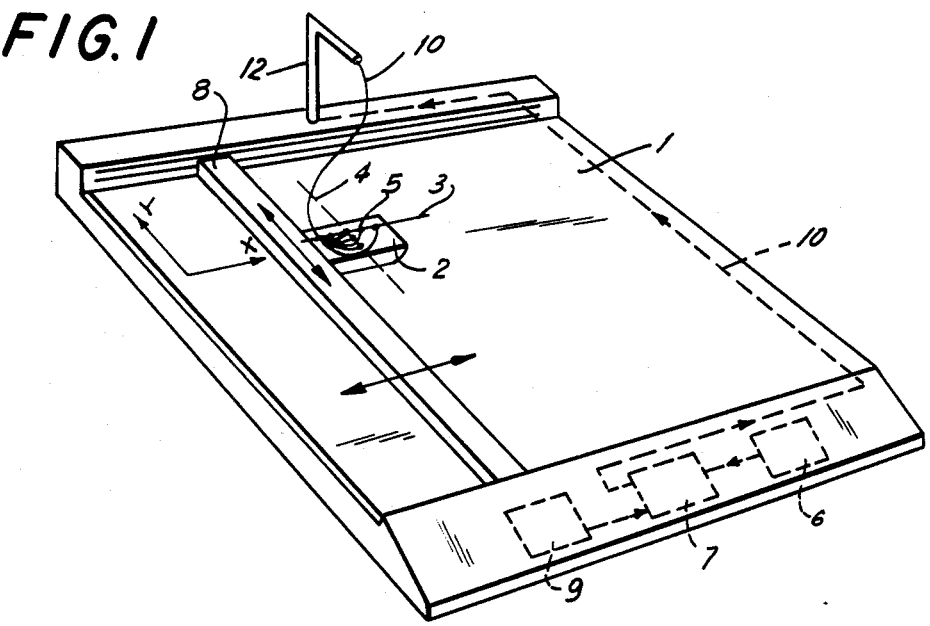
FIG. 1 represents a perspective view of an embodiment of my invention.

As illustrated by way of example in FIG. 1, a device for the writing of graphic symbols according to the invention comprises a recording medium 1 and a writing head 2. The writing head overlies only a small part of the area of recording medium 1 and is movable in two mutually orthogonal reference directions X and Y paralleling its edges. To this end, the writing head 2 is slidable in the direction Y on a guidetrack formed by a supporting bar 8 which in turn is displaceable in the direction X. The drive means performing such a displacement of the writing head 2 in the directions X and Y, schematically indicated by arrows, are known per se and have been illustrated only diagrammatically at 40X and 40Y in FIG. 4.

According to the invention, the writing head 2 comprises several (here two) intersecting linear electrode arrays 3 and 4, one parallel to one of the two aforementioned reference directions and the other generally transverse thereto; in this specific instance, the linear electrode array 3 is parallel to the reference direction X. Each electrode 5 is connected to a pulse generator 6 by means of a switching circuit 7 commanded by a control unit 9 as more fully described below with reference to FIG. 4. The connection between the switching circuit 7 and the electrodes 5 of the writing head is effected by the intermediary of a wire multiple 10 of suitable length, supported by a post 12.

The electrodes 5 of the writing head 2 are in contact with the recording medium 1 during their displacement. The recording medium 1 consists, for example, of a dark-colored rectangular sheet of paper whose face in contact with the electrodes 5 is coated with a thin aluminum layer maintained in operation at a fixed reference potential.

The operation of the writing device is as follows:

According to the address given in terms in co-ordinates X, Y with respect to the recording medium 1, and pursuant to a predetermined program or sequence, a succession of electric pulses are delivered by the pulse generator 6 to electrodes whose co-ordinates are specified by the switching circuit 7 under the control a unit 9. The control unit 9 emits, on the other hand, data relating to the actual position or address of the writing head 2, communicated to it by the drive means 40X and 40Y, and on the other hand data relating to the coding of the symbols or characters to be inscribed. The electric pulses delivered to the electrodes for a specified address cause, at the point of contact of the electrode considered with the recording medium, a fusion of the aluminum layer producing a dot at the corresponding address as the dark-colored layer of the recording medium becomes visible. The establishment of these dots on the surface of the recording medium according to the specified program or sequence permits the inscription of graphic and/or alphanumerical symbols on sheet 1.

For this purpose the control unit 9 may be constituted by circuits of discrete elements or by a program executed by a microprocessor delivering or receiving the aforementioned data relating to the address co-ordinates of the writing head 2 during its displacement and to the nature of the graphic and/or alphanumerical symbols to be inscribed.

The control unit 9 comprises registers or tables containing the parameters of the different symbols utilized. These tables indicate for each of the symbols the characters constituting it and the manner in which these characters are to be combined.

The control unit 9 also includes a table of characters comprising, besides alphanumerical characters, the usual signs and the various elementary tracings such as, for example, straight lines, angles, arcs, and arrows of diverse orientation and shapes.

Finally, to enable the formation of several symbols in a single displacement or pass of the writing head 2, it is possible to superpose several symbols on a linear electrode array corresponding to the line of dots to be inscribed. To this end, the control unit 9 comprises means for successive or simultaneous call-up of corresponding tables.

Figure 2A:
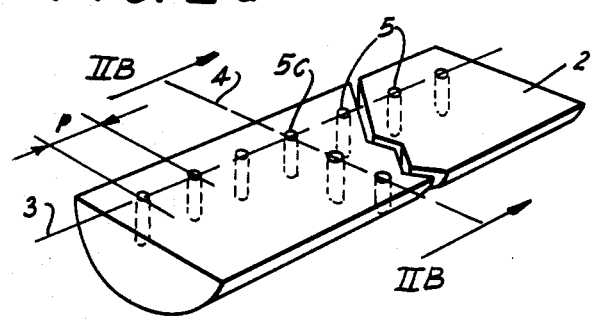
FIG. 2a is a perspective detail view of a writing head included in the embodiment of FIG. 1.
Figure 2B:
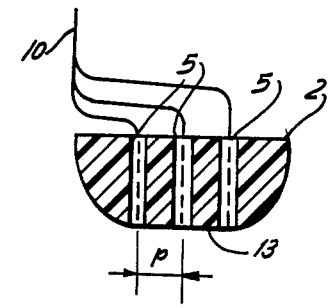

In the embodiment of FIGS. 1, 2a and 2b, the electrodes of the two arrays 3 and 4 are closely juxtaposed with a pitch p. The first linear electrode array 3 may comprise, for example, forty-two electrodes (only some of which are shown in FIG. 2a) spaced apart with a pitch p of 0.363 mm. Thus, a group of seven electrodes plus an inter-electrode gap corresponds to a length of 2.54 millimeters, or one inch, the usual dimension of one character in the X direction. The first linear array 3 then has a total length of 17.417 millimeters. The second linear array 4 is orthogonal to the first array and has one of its electrodes in common with the first linear array at that point of intersection, preferably the electrode 5C situated near the middle of the first linear array. The pitch P of the second linear array (see FIG. 2b) is identical with that of the first one and equal to 0.363 mm.

The body of the writing head 2 is of substantially semicylindrical shape and is made of an insulating material such as, for example, a thermosetting resin. The electrodes 5 are imbedded in the body and have a diameter on the order of 0.1 millimeter. The electrodes are made of, for example, silver-coated tungsten and are flush with the level of a contact surface 13 of the writing-head body. The second linear electrode array 4 permits a utilization of the device as a tracer of curves having a specified width, as explained hereinafter with reference to FIGS. 7a–7c. I may employ more than two intersecting linear electrode arrays of any orientation sharing one common electrode, though for the sake of simplicity I prefer the use of only two orthogonal linear arrays 3 and 4. The addition of further linear arrays 23, 24 of like pitch and different orientation, shown in FIG. 3, results in a series of electrodes disposed on concentric circles having as their center the common electrode 5c.

Figure 4:
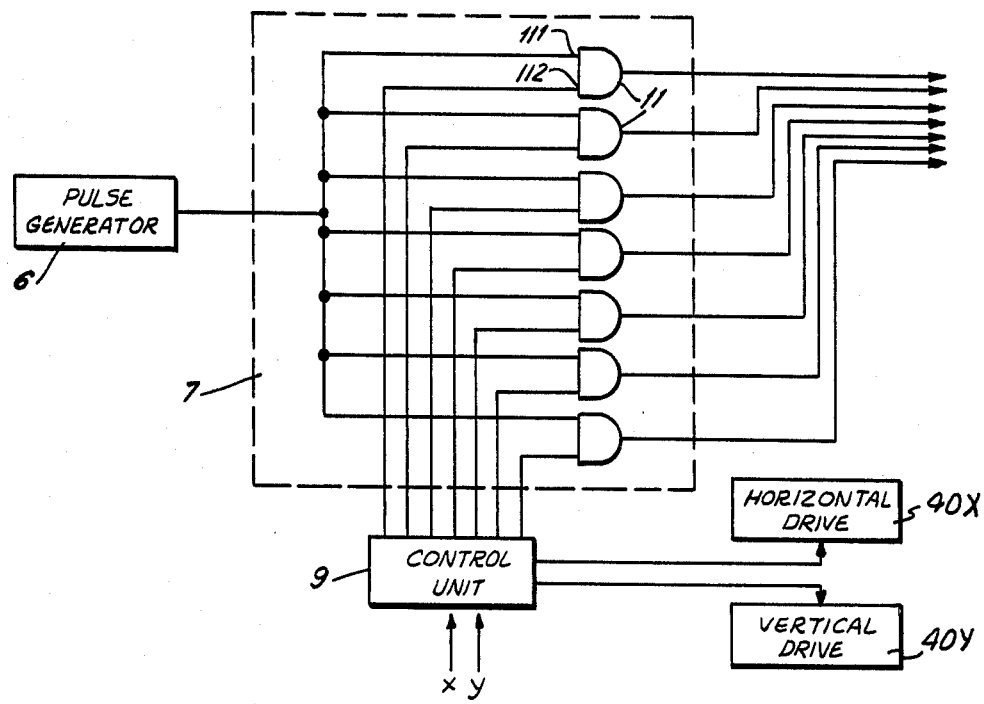
FIG. 4 is a diagram of a switching circuit for the embodiment of FIG. 1.

The switching circuit 7 shown in FIG. 4 receives from the pulse generator 6 electric pulses synchronized with the displacement of the writing head. The pulses have a period which corresponds to a displacement of the writing head, in the direction Y, by a distance equal to a specified fraction of the pitch P of the electrodes. The value of this fraction can be modified by an adjustment designed to vary the dimension of the elementary characters along the direction Y.

The pulses from generator 6 of short duration on the order of 50 microseconds and of an amplitude on the order of 60 volts, are transmitted to respective inputs 111 of a plurality of switches 11 shown as AND gates. The other input 112 of each of these AND gates 11 is directly connected to a corresponding output of the control unit 9. Switching may be simplified by the use of conventional systems enabling a scanning by selected points or series of points such as that defining the extend of an elementary character along axis X.

The output of each AND gate 11 is connected to a respective electrode of the writing head. This connection, established in the embodiment of FIG. 1 by the wire multiple 10, could also be effected by means of rails disposed on the supporting bar 8 and by sliding contacts, or with the aid of an optical fiber and series transmission of data coded at the output of switching circuit 7 and then decoded and distributed to the several electrodes 5.

Thus, each electrode of the writing programmed data relating to the address of each of the electrodes of the writing head and to the graphic symbol to be written, the control unit 9 emits signals causing the conduction or the nonconduction of gates 11 and the generation, at the address of the corresponding electrode, of the aforedescribed dot on the recording sheet 1.

Figure 6:
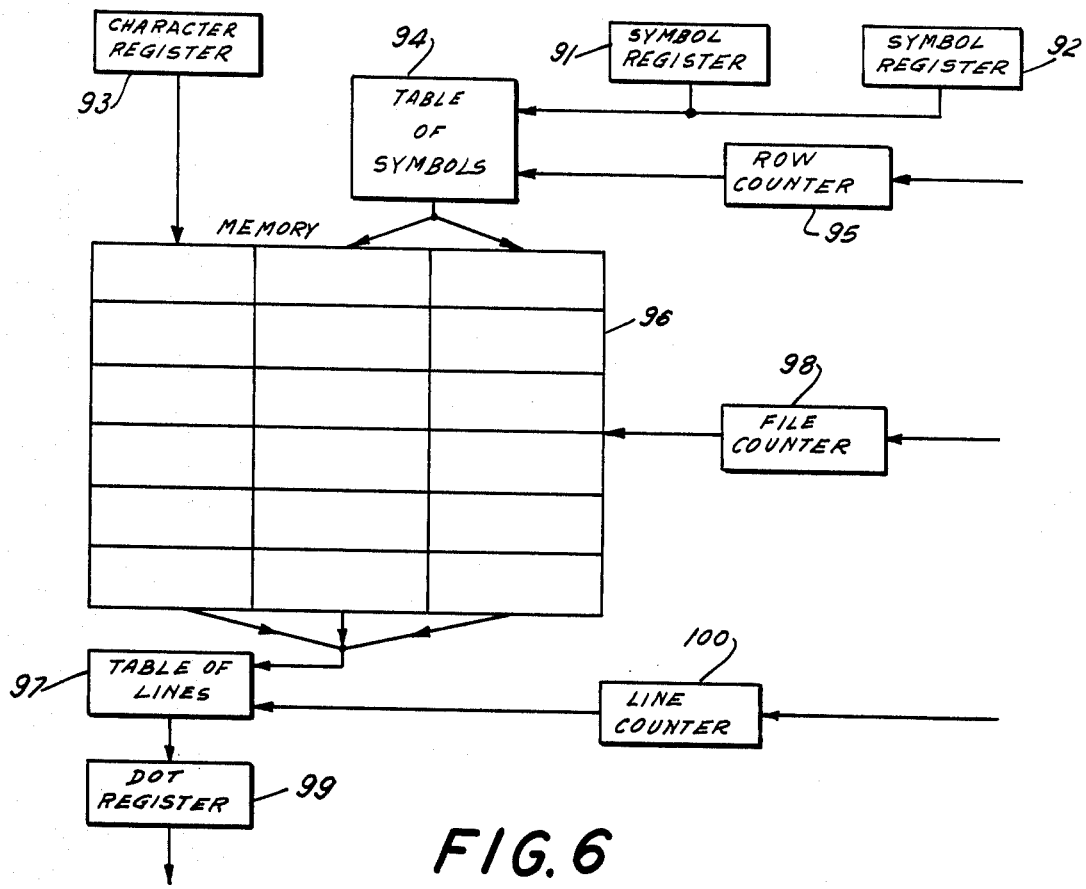
FIG. 6 is a synoptic block diagram of the writing logic of a control unit also shown in FIG. 4.

I shall now describe the operation of the device during the inscription of graphic and/or alphanumerical symbols, with reference to the synoptic diagram of the writing logic represented in FIG. 6.

When the device is to inscribe a graph, the writing head is first of all brought to the point of the recording medium whose co-ordinates correspond to the first line of the graphic symbol, then the writing head is moved along guide bar 8 in the direction Y perpendicular to the linear electrode array 3. Simultaneously, and taking into account the data relating to the addresses of each electrode as a function of the co-ordinates of the writing head during its displacement, the electric pulses are sent to the electrodes corresponding to the dots to be written in forming the graphic symbols to be reproduced. The pitch of the lines is a function of the pulse period and of the translation velocity of the head in the direction Y. After nine cycles of scanning a line of dots, the height of a row of characters, namely nine lines of dots, is written on the recording medium 1, a line of dots being defined by the forty-two electrodes of the embodiment described above. One line of dots corresponds, for example, to the standardized dimension in the direction X of six alphanumerical characters which define a column on the recording medium. The standardized width of an elementary character corresponds to a file. It is of course possible to repeat the process on as many rows of characters as necessary or as the recording medium is able to contain along the corresponding dimension.

Figure 5:
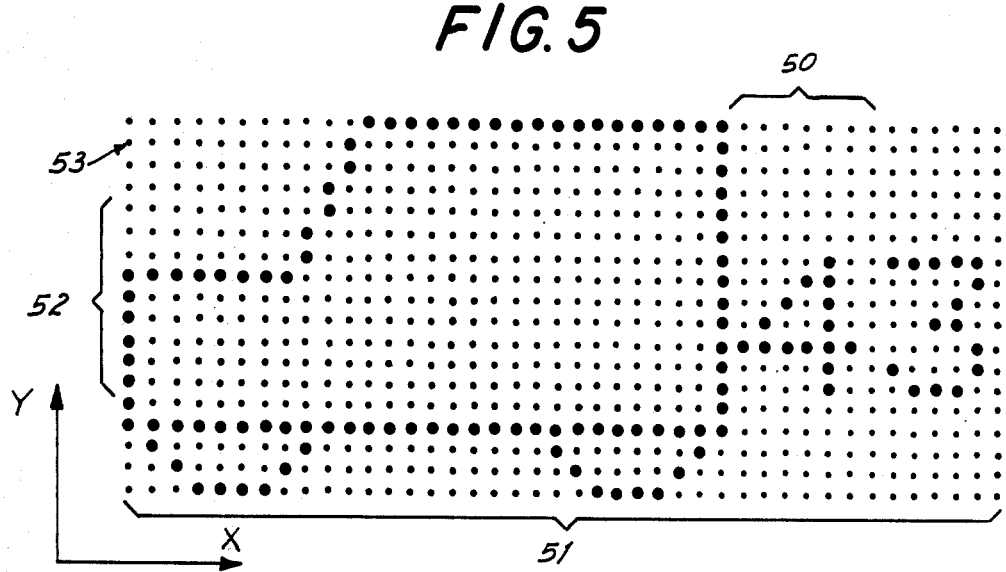
FIG. 5 shows a pattern of marks obtained with the aid of the device according to the invention on a recording medium.

FIG. 5 illustrates the stages of the process of recording a specific pattern. The small dots represent the positions of those electrodes which in the course of displacement of the writing head have not been energized by the pulse generator according to the sequence or program enabling the writing of the pattern represented. The large dots, on the other hand, represent the fusion points or marks on the recording medium caused by the pulses applied to the corresponding electrodes in conformity with that sequence of program.

A line of dots 53 extending in the direction X (horizontal in FIG. 5) corresponds in the course of writing to the location of the forty-two electrodes of the writing head. A file 50 corresponds to a grouping of seven adjoining vertical series of dots. A character row 52 corresponds to a grouping of nine dot lines 53. A column 51 corresponds to a grouping of six consecutive files 50.

According to FIG. 6, the control unit 9 comprises two symbol registers 91 and 92 and one character register 93. The symbol registers 91 and 92 allow the selection of, for example, geometric symbols to be inscribed; the register 93 allows the selection of alphanumerical characters capable of completing and identifying the symbols to be registered. For the sake of clarity, the symbols to be inscribed occupy several character rows 52 (FIG. 5) in the vertical or Y direction. In FIG. 5 I have shown, by way of example, the outline of a car synthesized from such geometric symbols together with two alphanumerical characters "4" and "3".

The registers 91 and 92 are coupled to a memory 96 by means of a table of symbols 94. The memory 96 includes, according to the embodiment of FIG. 6, three sections allowing the superposition of two symbols and one elementary character. The table of symbols 94, controlled by a row counter 95, enables the several sections of memory 96 to store characters corresponding to the organization of each of the symbols. Each box or cell of any memory section corresponds to an area of intersection of a given row and file containing enough dots, as seen in FIG. 5, to define an alphanumerical character; the passage from one file to another is carried out within each memory section under the control of a file counter 98.

The data relating to a column and to a row are transmitted to a table of lines 97 97, controlled by a line-of-dots counter 100 which identifies the seven corresponding bits of information and permits the definition of a character or symbol at the dot-line level.

The table of lines 97 receives also the data relating to the elementary characters to be superposed upon or juxtaposed with the two symbols that can be simultaneously displayed in each column, such as the two arcs symbolizing vehicle wheels in FIG. 5. The character is put into the file and the row desired, as represented in FIG. 5 with reference to the numerals "4" and "3", at the time of passage of the writing head across the corresponding row 52. The table of lines 97 delivers the seven data bits enabling the definition of a character at the dot-line level, the contents of the three memory sections being superposable by readout to a register 99 storing the dot distribution of a line. The dot register 99 enables the control of pulses at the input of the switching circuit 7.

The process passes through all the files of a line of dots 53, then advances to the following line of dots in the same column 51. The traverse of nine lines of dots, constituting a row 52, permits the passing to the following row of the column. The line counter 100, the file counter 98 and the row counter 95 receive the data relating respectively to the line, to the file and to the row of a column determined by the position of guide bar 8 (FIG. 1), this position constituting, at a given moment of the process, one of the address parameters of the writing head. The procedure will, of course, be repeated in different positions of bar 8 to sweep other columns of 42-dot lines if all or a major part of sheet 1 is to be scanned.

Any similar device including more than three memory sections and capable of effecting the superposition of more than two symbols and of one elementary character or any simplified device permitting to inscribe only a single symbol at a given address could be used in a system according to my present invention.

The device according to the invention can be used as a curve tracer. For this purpose a particular combination of electrodes of the linear arrays forming part of the writing head is utilized. The trace of the stroke obtained has a specified width taking into account the combination of the electrodes selected for energization. Naturally, the law of displacement of guide bar 8 in the X direction and of writing head 2 along that bar in the Y direction will differ in that case from the recurrent columnar sweep described above.

Figure 7A:
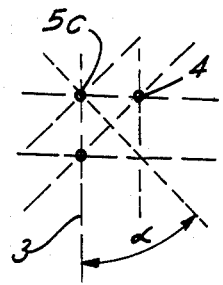
FIGS. 7a, 7b, 7c are diagrams illustrating the operation of the device according to the invention as a curve tracer.
Figure 7B:
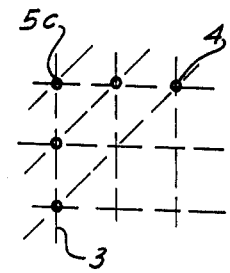

Preferably, the energized electrodes include the common electrode 5c along with adjacent electrodes on each of the linear arrays. Thus, as represented in FIGS. 7a and 7b, the width of the trace of the stroke is doubled or tripled with the use of one or two adjacent electrodes jointly with electrode 5c. The tracing of a double stroke is also possible.

Figure 3:
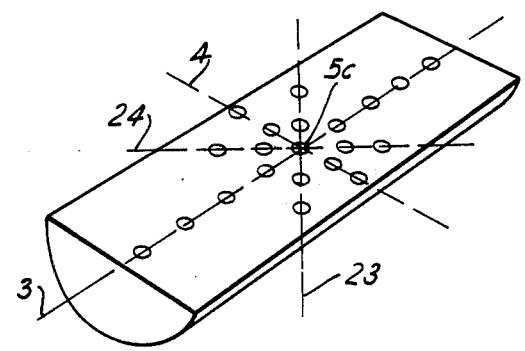
FIG. 3 is a view similar to FIG. 2a, showing a modified array of electrodes on the writing head.
Figure 7C:
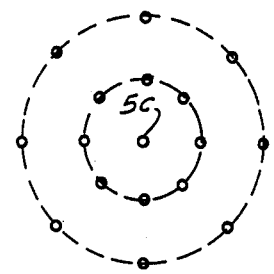

To avoid the dividing of a trace into three different lines in the case of FIG. 7a, e.g. and for an angle of displacement α with respect to the linear array 3, one can advantageously use a recording head similar to that of FIG. 3 comprising a plurality of linear electrode arrays of different orientation starting at the central electrode 5c. The simultaneous energization, as represented in FIG. 7c, of the central electrode 5c and of the electrodes disposed along concentric circular rings centered on the electrode 5c makes it possible to form a more or less unitary trace of large width for certain angles of displacement of the writing head.

A periodic modulation of the energization voltage of the electrodes permits, according to the frequency of that modulation, either a dotted tracing or a tracing giving the impression of a continuous stroke.

I claim:

1. A device for the inscription of graphic and alphanumerical symbols, comprising:

a recording medium adapted to be marked by the localized application of electric energy thereto;

support means forming a guidetrack extending in a first direction across said recording medium, said support means being displaceable in a second direction transverse to said first direction;

a writing head movably carried on said support means for displacement along said guidetrack in said first direction, said writing head being provided with a multiplicity of parallel electrodes closely juxtaposed with said recording medium and equispaced in a linear array extending in said second direction over a fraction of the dimension of said recording medium transverse to said guidetrack;

drive means for moving said array across said recording medium by displacing said writing head along said guidetrack in said first direction and said support means transversely thereto in said second direction;

a pulse generator synchronized with said drive means and adapted to energize any of said electrodes for producing a visible mark at a corresponding location of said recording medium;

switching means inserted between said pulse generator and said electrodes; and control means for operating said switching means in timed relationship with the displacement of said writing head by said drive means for selectively energizing said electrodes to form a predetermined pattern of marks on said recording medium.

2. A device as defined in claim 1 wherein said switching means comprises a set of AND gates each having an output connected to a respective electrode, a first input connected to said pulse generator and a second input connected to an output of said control means individually associated with said respective electrode.

3. A device as defined in claim 1 wherein the area of said recording medium is divided into columns parallel to said first direction having a width in said second direction equal to the length of said array, the positions of said electrodes upon the occurrence of a pulse from said generator defining a line of dots extending in said second direction, said line of dots recurring at locations spaced apart within each column in said first direction with the generation of further pulses during displacement of said writing head along said guidetrack, each column being subdivided in said second direction into a plurality of files each encompassing a predetermined number of dots of each line, adjacent lines of dots in each column being grouped into rows each including a predetermined number of said lines, said rows and files intersecting along areas each containing enough dots to define an alphanumerical character;

said control means comprising storage means for data relating to symbols to be inscribed, a memory divided into cells respectively assigned to said areas of intersection, a row counter and a file counter controlling the loading of said cells with selected data from said storage means, and a line counter controlling the readout of said data from said memory.

4. A device as defined in claim 3 wherein said storage means includes separate registers for graphic symbols and for alphanumerical characters, said memory being divided into sections respectively connected to said registers for loading of their cells with graphic symbols and alphanumerical characters to be jointly inscribed in the files and rows of a column.

5. A device as defined in claim 3 wherein said pulse generator has an operating frequency so related to the displacement of said writing head along said guidetrack that adjacent lines of dots are separated by distances smaller than the pitch of said electrodes.

6. A device as defined in claim 1 wherein said writing head is provided with additional electrodes forming at least one further linear array generally transverse to the first-mentioned array, said additional electrodes being energizable by said pulse generator jointly with respective electrodes of said first-mentioned array to form parallel traces on said recording medium upon displacement of said writing head in a direction deviating from said first direction.

7. A device as defined in claim 6 wherein said arrays have one electrode in common.

8. A device as defined in claim 9 wherein said additional electrodes form a plurality of concentric rings centered on said common electrode.

9. A device as defined in claim 6 wherein the pitch of said electrodes in said further array is the same as in said first-mentioned array.

10. A device as defined in claim 6 wherein said writing head comprises a resinous body of generally semicylindrical shape with an axis extending in said second direction, said electrodes being embedded in said body and consisting of silver-coated tungsten.

* * * * *